United States Patent [19]

Escue

[11] Patent Number: 4,580,704

[45] Date of Patent: Apr. 8, 1986

[54] DISPENSER FOR DISCHARGING SUBSTANCES ON DEMAND

[76] Inventor: Jesse W. Escue, 1010 Buell Ave., Joliet, Ill. 60435

[21] Appl. No.: 616,573

[22] Filed: Jun. 4, 1984

[51] Int. Cl.[4] ............................................. G01F 11/24
[52] U.S. Cl. ..................................... 222/367; 222/410
[58] Field of Search ............... 222/367, 241, 386, 242, 222/410, 412, 319, 325, 336, 342, 413; 415/169 R, 170 B

[56] References Cited

U.S. PATENT DOCUMENTS 1,756,002  4/1930  Nagy ..................................... 222/367
3,794,215  2/1974  Osterhaus ........................ 222/410 X Primary Examiner—Stanley H. Tollberg Attorney, Agent, or Firm—Wood, Dalton, Phillips, Mason & Rowe

[57] ABSTRACT

A dispenser for discharging a substance on demand. The dispenser includes a body having an opening for receiving the substance with the body being defined in part by a dispenser plate having an outlet extending therethrough. It also includes a rotatable plate biased against a dispenser surface of the dispenser plate with the rotatable plate having a surface contacting the dispenser surface and an edge confronting the substance. The contacting surface has a tapered channel leading away from the confronting edge with the channel having a maximum depth at the confronting edge and tapering to the contacting surface. The dispenser also features the outlet extending through the dispenser plate so as to lie in the path of travel of the channel during rotation of the plate. With this arrangement, a handle can be provided for rotating the plate.

18 Claims, 4 Drawing Figures

DISPENSER FOR DISCHARGING SUBSTANCES ON DEMAND

BACKGROUND OF THE INVENTION

The present invention generally relates to dispensers and, more particularly, to a dispenser for discharging a substance on demand.

In the past, a wide variety of dispensers have been proposed for many purposes. One commonly known type of dispenser is provided for dispensing various soaps for human use. Such soaps range from liquid soap, to cream soap, to powder soap, to bar soap, to pumice soap. One commonly accepted type of problem is associated with dispensing pumice soap in industrial settings. In particular, pumice soap has a strong tendency to cause damage through abrasive action on the operative components of a dispenser.

In addition, many dispensers are designed to operate in a manner that encourages waste. It is common, for instance, for dispensers to either discharge continuously in response to activation of a release valve by a user or, at a minimum, there are many dispensers which discharge more than a required amount of soap. As a result, there has been a significant need for improved dispensers for soap.

Moreover, this same need extends to other substances suited for discharge from a dispenser. It is well known that dispensers for many substances could be improved by structure especially adapted to discharge a discrete amount of a substance on demand, particularly where such structure was designed in such a fashion that abrasive action or the like would not damage the operative components. As a result, it is an object of the present invention to overcome such problems.

SUMMARY OF THE INVENTION

According, the present invention is directed to a dispenser for discharging a substance on demand. The dispenser includes a body having an opening for receiving the substance with the body being defined in part by a dispenser plate having an outlet extending therethrough. It also includes a rotatable plate biased against a dispenser surface of the dispenser plate with the rotatable plate having a surface contacting the dispenser surface and an edge confronting the substance. The contacting surface has a tapered channel leading away from the confronting edge with the channel having a maximum depth at the confronting edge and tapering to the contacting surface. The dispenser also features the outlet extending through the dispenser plate so as to lie in the path of travel of the channel during rotation of the plate. With this arrangement, means are also provided for rotating the plate to discharge a discrete amoung of the substance through the outlet on demand.

In a preferred embodiment, the body includes a side wall joined to the dispenser plate. The side wall and dispenser plate together define a cavity for holding the substance prior to discharge and the opening in the body is defined by the upper end of the side wall. Also, the body includes a baffle joined to the side wall to extend across the inside of the cavity above the plate.

Additional details include the body being generally cylindrical in shape. The dispenser plate is then generally circular and the side wall extends upwardly from the circumferential edge of the dispenser plate. Additionally, the baffle is preferably disposed diagonally across the cavity.

In the preferred embodiment, the body includes means for securing a container filled with the substance in an inverted position over the cavity. The container is removable when empty for replacement with another filled container. Moreover, the dispenser preferably includes a mounting bracket integral with the body and extending downwardly from the body at a point where the side wall meets the dispenser plate.

With regard to the rotatable plate, it is preferably generally circular in shape. The rotatable plate is then rotatable about its center and has a circumferential edge cut away along a chord to define the confronting edge. Additionally, the tapered channel is preferably curved to follow the circumferential edge of the plate.

In the preferred embodiment, the rotatable plate has a second tapered channel in the contacting surface such that one of the channels advantageously leads away from the confronting edge on one side thereof and the other of the channels leads away from the confronting edge on the other side thereof. The channels both have a maximum depth at the confronting edge and taper to the contacting surface. Moreover, the channels also are radially spaced inwardly from the circumferential edge of the plate and the outlet extending through the dispenser plate is disposed so as to lie in the path of travel of the channels during rotation of the plate.

Among still other details of construction of the present invention are the rotating means including a pin extending through the dispenser plate. One end of the pin is preferably joined to the rotatable plate such that rotation of the pin imparts rotation to the plate. In addition, the other end of the pin is joined to a handle externally of the body for manual activation by a user.

Also, the dispenser plate preferably includes an opening defined by a downwardly extending sleeve through which the pin extends. The sleeve and opening advantageously have a bushing therein extending externally of the cavity and the pin is disposed for rotation within the bushing. Moreover, the rotatable plate is preferably biased against the dispenser plate by means of a spring disposed between the handle and the body.

Still other objects, advantages and features of the present invention will be apparent from a consideration of the details of construction and operation set forth herein.

DETAILED DESCRIPTION OF THE PREFERRED EMBODIMENT

Figure 1:
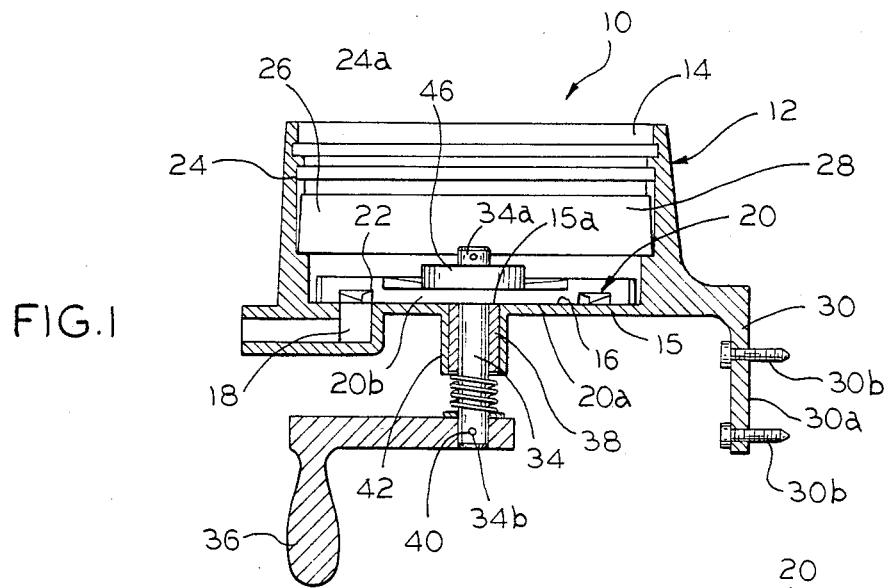
FIG. 1 is a cross sectional view of a dispenser in accordance with the present invention.

Referring to FIG. 1, the reference numeral 10 designates generally a dispenser for discharging a substance on demand in accordance with the present invention. The dispenser 10 includes a body 12 having an opening 14 for receiving the substance (not shown), the body 12 being defined in part by a dispenser plate 15 having a dispenser surface 16. As shown, the dispenser plate 15 has an outlet 18 extending therethrough and the outlet 18 is provided for discharging the substance as will be described in detail hereinafter.

Still referring to FIG. 1, the dispenser 10 includes means for discharging a discrete amount of the substance on demand including a rotatable plate 20 biased against the dispenser surface 16. The rotatable plate 20 has a surface 20a contacting or confronting the dispenser surface 16 and an edge 20b confronting the substance within the body 12 with the contacting surface 20a having a tapered channel 22 (see, also, FIGS. 2 and 3) leading away from the confronting edge 20b, the channel 22 having a maximum depth at the confronting edge 20b and tapering to the contacting surface 20a. Again referring to FIG. 1, the dispenser 10 is arranged so that the outlet 18 extending through the dispenser surface 16 is in the path of travel of the channel 22 during rotation of the plate 20.

As shown in FIG. 1, the body 12 includes a side wall 24 joined to the dispenser plate 15. The side wall 24 and dispenser plate 15 together define a cavity 26 for holding the substance (not shown) prior to discharge. As will be appreciated, the opening 14 is defined by the upper end of the side wall 24.

Still referring to FIG. 1, the body 12 includes a baffle 28 inside the cavity 26. The baffle 28 preferably extends across the cavity 26 above the plate 20 and is joined to the side wall 24. It will also be appreciated that the body 12 is advantageously generally cylindrical in shape and the dispenser plate 15 is generally circular such that the side wall 24 extends upwardly from the circumferential edge thereof. The baffle 28 is preferably disposed diagonally across the cavity 26 and serves to evenly distribute the substance for engagement by the plate 20. With this arrangement, the rotatable plate 20 is also preferably generally circular in shape and is rotatable about the center 20c thereof (see FIG. 2).

As will be appreciated by referring to FIG. 1, the body 12 includes means for securing a container filled with the substance in an inverted position over the cavity 26. The container (not shown) can be threadingly engaged with the inner surface 24a of the side wall 24 or can simply be designed to telescopically or frictionally fit within the side wall 24 and rest upon a shoulder, for instance, within the cavity 26. Whatever the means utilized in a specific application, the container will be removable when empty for replacement with another filled container.

Figure 4:
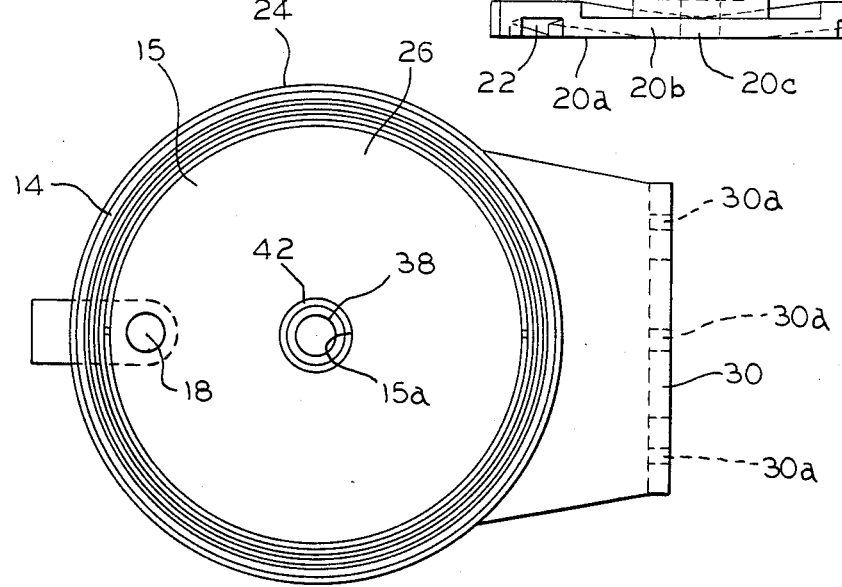
FIG. 4 is a top plan view with the rotatable plate and pin removed in accordance with the dispenser illustrated in FIG. 1.

Referring to FIGS. 1 and 4, a mounting bracket 30 is provided for mounting the body 12 to a surface such as a wall (not shown). The mounting bracket 30 is preferably integral with the body 12 and extends downwardly from the body 12 at a point where the side wall 24 meets the dispenser plate 15. With this arrangement, the mounting bracket 30 may be provided with holes 30a adapted to receive fasteners such as screws 30b.

Figure 2:
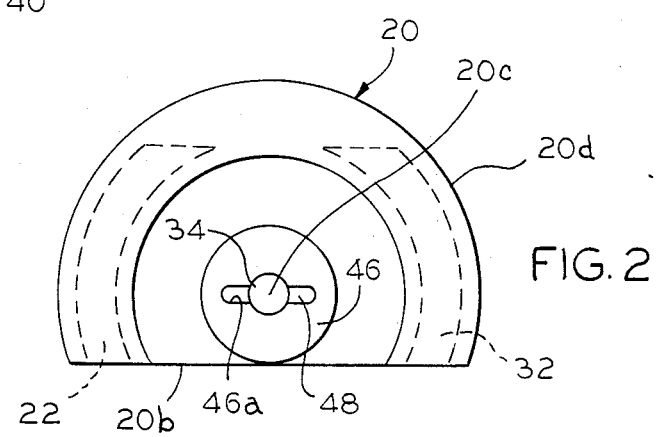
FIG. 2 is a top plan view of the rotatable plate with the pin in place in accordance with the dispenser illustrated in FIG. 1.
Figure 3:
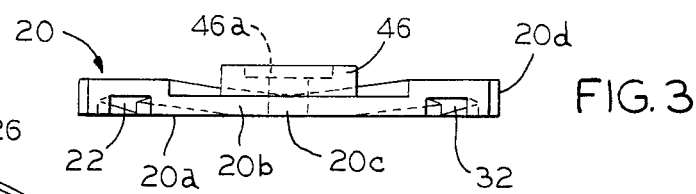
FIG. 3 is a front elevational view of the rotatable plate with the pin removed in accordance with the dispenser illustrated in FIG. 1.

As previously mentioned, the rotatable plate 20 is generally circular in shape. The plate 20 has a circumferential edge 20d cut away along a chord thereof to define the confronting edge 20b. In addition, the tapered channel 22 is curved (as shown in FIGS. 2 and 3) to follow the circumferential edge 20d.

In fact, in a preferred embodiment, the rotatable plate 20 has a second tapered channel 32 in the contacting surface 20a. One of the channels 22 leads away from the confronting edge 20b on one side thereof and the other of the channels 32 leads away from the confronting edge 20b on the other side thereof, and the channels 22 and 32 are radially spaced inwardly from the circumferential edge 20d of the plate 20. In addition, the channels 22 and 32 have a maximum depth at the confronting edge 20b and taper to the contacting surface 20a.

As previously mentioned, the outlet 18 in the dispenser surface 16 is disposed so as to lie in the path of travel of the channel 22. It will be appreciated, of course, that the outlet 18 is also disposed so as to lie in the path of travel of the channel 32, and the outlet 18 is preferably located opposite the bracket 30 extending downwardly and radially outwardly to a position beyond the remainder of the dispenser 10 to facilitate its use. As a result, the plate 20 can be rotated to discharge a discrete amount of the substance on demand from either of the channels 22 and 32.

Referring again to FIG. 1, the dispenser 10 includes means for rotating the plate 20. The rotating means preferably includes a pin 34 extending through the dispenser plate 15 where one end 34a of the pin 34 is joined to the rotatable plate 20 in such a manner that rotation of the pin 34 imparts rotation to the plate 20 and the other end 30b of the pin 34 is joined to a handle 36 for rotation therewith externally of the body 12. As shown, the dispenser plate 15 includes an opening 15a through which the pin 34 extends.

Still referring to FIG. 1, the opening 15a has a bushing 38 therein extending externally of the cavity 26 so as not to interfere with rotation of the rotatable plate 20. The pin 34 is disposed for rotation within the bushing 38 in conventional fashion as will be appreciated by those skilled in the art. Also as shown, the rotatable plate 20 is biased against the dispenser plate 15 by means of a spring 40 disposed between the handle 36 and the bushing 38.

More particularly, the body 12 includes a cylindrical sleeve 42 extending downwardly from the dispenser plate 15. The sleeve 42 extends downwardly from the dispenser plate 15 in concentric relation with the opening 15a and the bushing 38 is disposed therein. As shown, the spring 40 is actually disposed between the handle 36 and lowermost extent of the bushing 38 and sleeve 42.

Referring to FIGS. 1 through 3, the pin 34 is secured to the handle 36 by means of a pin 44 extending through the pin 34 and the handle 36. It will also be seen that the pin 34 extends through a fastening disc or element 46 integral with the rotatable plate 20 and having a diagonally extending slot 46a (see FIGS. 2 and 3) adapted to receive a pin 48 extending through an opening (not shown) in the pin 34. Also as shown, the pin 34 includes one or more openings 50 in the end 34a thereof adapted to receive a cotter pin (not shown).

As will be appreciated by those skilled in the art, the cotter pin (not shown) and the pin 44 hold the components of the rotating means in assembled relation. The pin 48 is held within the diagonally extending slot 46a by means of the spring 40 disposed between the handle 36 and lowermost extent of the bushing 38 and sleeve 42 since the spring 40 exerts a downward force on the pin 34 and this in turn biases the contacting surface 20a of the rotatable plate 20 against the dispenser surface 16 of the dispenser plate 15. With this arrangement, rotation of the handle 36 in either direction causes the rotatable plate 20 to be rotated in the same direction by means of the pin 48 disposed in the slot 46a.

As will be appreciated, rotation of the rotatable plate 20 in either direction will serve to discharge a discrete amount of the substance on demand by reason of the fact that the rotatable plate 20 includes two tapered channels 22 and 32 disposed on opposite sides of the confronting edge 20b. Since the substance will settle into contact with the dispenser surface 16 by means of gravity, rotation of the rotatable plate 20 will cause a discrete amount of the substance to be isolated in one of the tapered channels 22 and 32 depending upon the direction of rotation and the substance will be discharged through the opening 18 as the tapered channel carrying the substance passes over the opening 18. Still more particularly, rotation of the handle 36 in a clockwise direction (when viewed from below) will cause a discreet amount of the substance to be isolated in the tapered channel 22 and then discharged through the outlet 18 whereas rotation of the handle 36 in a counterclockwise direction (again when viewed from below) will cause a discreet amount of the substance to be isolated in the tapered channel 32 and then discharged through the outlet 18.

Since the tapered channels 22 and 32 have a maximum depth at the confronting edge 20b and taper to the contacting surface 20a, the substance isolated in one of the channels will be forced downwardly into the opening 18 as that channel passes over the opening. As will be appreciated, it is this action which serves to discharge a discrete amount of the substance thereby limiting waste and, in addition, the unique structure of the dispenser serves to significantly reduce or avoid damage from abrasive action.

Still more particularly, rotation of the handle 36 in a clockwise direction (when viewed from below) will cause a discrete amount of the substance to be isolated in the tapered channel 22 and then discharged through the outlet 18 whereas rotation of the handle 36 in a counterclockwise direction (again when viewed from below) will cause a discrete amount of the substance to be isolated in the tapered channel 32 and then discharged through the outlet 18.

In particular, if the dispenser 10 is utilized for pumice soap, the normal abrasive action actually serves to facilitate operation of the device in a unique and effective manner. The pumice soap accumulates in the tapered channels 22 or 32 and acts in bearing fashion as the rotatable plate 20 is rotated until it is forced through the opening 18. In addition, in order to control the amount of a substance discharged by the dispenser, the rotatable plate 20 can be replaced by other plates having channels of varying widths, depths, and lengths.

In view of the above, the present invention provides a unique dispenser for discharging a substance on demand. It is highly versatile, not subject to the usual damage caused by abrasive action of materials such as pumice soap, and avoids waste commonly encountered with many dispensers and substances commonly provided in dispensers. Moreover, the present invention is inexpensive to manufacture and easy to operate by anyone.

Variation in the details herein given may be made by those skilled in the art without departing from the spirit and scope of the invention as defined by the claims appended hereto.

I claim:

1. A dispenser for discharging a substance on demand, comprising:

a body having an opening for receiving the substance, the body being defined in part by a dispenser plate having a dispenser surface, the dispenser plate having an outlet extending therethrough;

means for discharging a discrete amount of the substance on demand including a rotatable plate biased against the dispenser plate, the rotatable plate having a surface contacting the dispenser surface and an edge confronting the substance, the rotatable plate being generally circular in shape, the plate being rotatable about the center thereof and having a circumferential edge cut away along a chord thereof to define the confronting edge, the contacting surface having a tapered channel leading away from the confronting edge, the tapered channel being curved to follow the circumferential edge and having a maximum depth at the confronting edge tapering to the contacting surface remote from the confronting edge, the outlet extending through the dispenser plate in the path of travel of the tapered channel during rotation of the rotatable plate; and means for rotating the rotatable plate to discharge a discrete amount of the substance through the outlet on demand.

2. The dispenser as defined by claim 1 wherein the body includes a side wall joined to the dispenser plate, the side wall and dispenser plate together defining a cavity for holding the substance prior to discharge, the opening being defined by the upper end of the side wall.

3. The dispenser as defined by claim 2 wherein the body includes a baffle inside the cavity, the baffle extending across the cavity above the plate, the baffle being joined to the side wall.

4. The dispenser as defined by claim 3 wherein the body is generally cylindrical in shape, the dispenser plate being generally circular and the side wall extending upwardly from the circumferential edge thereof, the baffle being disposed diagonally across the cavity.

5. The dispenser as defined by claim 4 wherein the body includes means for securing a container filled with the substance in an inverted position over the cavity, the container being removable when empty for replacement with another filled container.

6. The dispenser as defined by claim 5 including a mounting bracket integral with the body and extending downwardly from the body at a point where the side wall meets the dispenser plate.

7. The dispenser as defined by claim 1 wherein the rotatable plate has a second tapered channel in the contacting surface such that one of the channels leads away from the confronting edge on one side thereof and the other of the channels leads away from the confronting edge on the other side thereof.

8. The dispenser as defined by claim 7 wherein the channels have a maximum depth at the confronting edge and taper to the contacting surface, the channels also being radially spaced inwardly from the circumferential edge of the plate, the outlet in the dispenser plate being disposed so as to lie in the path of travel of the channels.

9. The dispenser as defined by claim 1 wherein the rotating means includes a pin extending through the dispenser plate, one end of the pin being joined to the rotatable plate such that rotation of the pin imparts rotation to the plate, the other end of the pin being joined to a handle externally of the body.

10. The dispenser as defined by claim 9 wherein the dispenser plate includes an opening through which the pin extends, the opening having a bushing therein and the pin being disposed for rotation within the bushing.

11. The dispenser as defined by claim 9 wherein the rotatable plate is biased against the dispenser plate by means of a spring disposed between the handle and the body.

12. A dispenser for discharging a substance on demand, comprising:

a body having an opening for receiving the substance, the body being defined in part by a dispenser plate having a dispenser surface, the dispenser plate having an outlet extending therethrough;

means for discharging a discrete amount of the substance on demand including a rotatable plate biased against the dispenser plate, the rotatable plate having a surface contacting the dispenser surface and an edge confronting the substance, the contacting surface having a pair of tapered channels such that one of the channels leads away from the confronting edge on one side thereof and the other of the channels leads away from the confronting edge on the other side thereof, the tapered channels having a maximum depth at the confronting edge and tapering to the contacting surface, the outlet extending through the dispenser plate in the path of travel of the tapered channels during rotation of the rotatable plate; and means for rotating the rotatable plate to discharge a discrete amount of the substance through the outlet on demand, the substance being discharged from one of the tapered channels when the rotatable plate is rotated in one direction, and the substance being discharged through the other of the tapered channels when the rotatable plate is rotated in the other direction.

13. The dispenser as defined by claim 12 wherein the body includes a side wall joined to the dispenser plate, the side wall and dispenser plate together defining a cavity for holding the substance prior to discharge, the opening being defined by the upper end of the side wall.

14. The dispenser as defined by claim 13 wherein the body includes a baffle inside the cavity, the baffle extending across the cavity above the plate, the baffle being joined to the side wall.

15. The dispenser as defined by claim 15 wherein the body is generally cylindrical in shape, the dispenser plate being generally circular and the side wall extending upwardly from the circumferential edge thereof, the baffle being disposed diagonally across the cavity.

16. The dispenser as defined by claim 15 wherein the body includes means for securing a container filled with the substance in an inverted position over the cavity, the container being removable when empty for replacement with another filled container.

17. The dispenser as defined by claim 13 wherein the rotatable plate is generally circular in shape, the plate being rotatable about the center thereof and having a circumferential edge cut away along a chord thereof to define the confronting edge, the tapered channels being curved to follow the circumferential edge.

18. The dispenser as defined by claim 12 wherein the channels have a maximum depth at the confronting edge and taper to the contacting surface, the channels also being radially spaced inwardly from the circumferential edge of the plate, the outlet in the dispenser plate being disposed so as to lie in the path of travel of the channels.

* * * * *